United States Patent
Imamura et al.

(10) Patent No.: US 10,342,049 B2
(45) Date of Patent: *Jul. 2, 2019

(54) INTEGRATED CIRCUIT FOR CONTROLLING SELECTION OF RANDOM ACCESS PREAMBLE SEQUENCE

(71) Applicant: PANASONIC CORPORATION, Osaka (JP)

(72) Inventors: Daichi Imamura, Beijing (CN); Takashi Iwai, Ishikawa (JP); Kazunori Inogai, Kanagawa (JP); Sadaki Futagi, Ishikawa (JP); Atsushi Matsumoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,324

(22) Filed: May 7, 2018

(65) Prior Publication Data

US 2018/0255588 A1 Sep. 6, 2018

Related U.S. Application Data

(63) Continuation of application No. 15/161,973, filed on May 23, 2016, now Pat. No. 9,992,798, which is a (Continued)

(30) Foreign Application Priority Data

Sep. 29, 2006 (JP) .................................. 2006-269327
Dec. 27, 2006 (JP) .................................. 2006-352897

(51) Int. Cl.
*H04L 5/00* (2006.01)
*H04W 74/08* (2009.01)
(Continued)

(52) U.S. Cl.
CPC ........ *H04W 74/0833* (2013.01); *H04B 1/707* (2013.01); *H04B 1/7083* (2013.01);
(Continued)

(58) Field of Classification Search
CPC ...... H04L 5/0048; H04L 5/0055; H04L 7/043
(Continued)

(56) References Cited

U.S. PATENT DOCUMENTS 6,424,618 B1 7/2002 Uesugi et al.
7,076,015 B2 1/2006 Bhatoolaul et al.
(Continued)

FOREIGN PATENT DOCUMENTS

CN 1207221 A 2/1999
CN 1310524 A 8/2001
(Continued)

OTHER PUBLICATIONS

Chinese Search Report, for corresponding Chinese Application No. 201210493429X, dated Sep. 3, 2014, 2 pages. (English Translation). (Continued)

*Primary Examiner* — Kevin Kim
(74) *Attorney, Agent, or Firm* — Seed IP Law Group LLP

(57) ABSTRACT

A sequence allocating method and apparatus wherein in a system where a plurality of different Zadoff-Chu sequences or GCL sequences are allocated to a single cell, the arithmetic amount and circuit scale of a correlating circuit at a receiving end can be reduced. In ST201, a counter (a) and a number (p) of current sequence allocations are initialized, and in ST202, it is determined whether the number (p) of current sequence allocations is coincident with a number (K) of allocations to one cell. In ST203, it is determined whether the number (K) of allocations to the one cell is odd or even. If K is even, in ST204-ST206, sequence numbers (r=a and r=N-a), which are not currently allocated, are combined and (Continued)

| INDEX | SEQUENCE NUMBER (r) | |
|---|---|---|
| 1 | 1 | N-1 |
| 2 | 2 | N-2 |
| 3 | 3 | N-3 |
| 4 | 4 | N-4 |
| 5 | 5 | N-5 |
| | | |
| | | |
| | | |
| FLOOR(N/2)-1 | FLOOR(N/2)-1 | FLOOR(N/2)+2 |
| FLOOR(N/2) | FLOOR(N/2) | FLOOR(N/2)+1 | then allocated. If K is odd, in ST207-ST212, for sequences that cannot be paired, one of sequence numbers (r=a and r=N-a), which are not currently allocated, is allocated.

10 Claims, 16 Drawing Sheets

Related U.S. Application Data continuation of application No. 14/970,255, filed on Dec. 15, 2015, now Pat. No. 9,374,129, which is a continuation of application No. 14/637,207, filed on Mar. 3, 2015, now Pat. No. 9,246,539, which is a continuation of application No. 13/614,451, filed on Sep. 13, 2012, now Pat. No. 9,025,545, which is a continuation of application No. 12/442,497, filed as application No. PCT/JP2007/069051 on Sep. 28, 2007, now Pat. No. 8,363,608.

(51) Int. Cl.

| | |
|---|---|
| *H04J 13/00* | (2011.01) |
| *H04J 13/22* | (2011.01) |
| *H04W 72/04* | (2009.01) |
| *H04B 1/707* | (2011.01) |
| *H04L 23/02* | (2006.01) |
| *H04B 1/7083* | (2011.01) |
| *H04J 13/10* | (2011.01) |
| *H04L 27/26* | (2006.01) |

(52) U.S. Cl.
CPC .......... *H04J 13/0062* (2013.01); *H04J 13/22* (2013.01); *H04L 5/0048* (2013.01); *H04L 23/02* (2013.01); *H04W 72/0453* (2013.01); *H04W 74/0875* (2013.01); *H04B 2201/70702* (2013.01); *H04B 2201/70713* (2013.01); *H04J 13/102* (2013.01); *H04L 27/2613* (2013.01); *H04W 72/04* (2013.01); *H04W 72/0446* (2013.01)

(58) Field of Classification Search
USPC .......................... 375/365, 366, 367; 370/329
See application file for complete search history.

(56) References Cited

U.S. PATENT DOCUMENTS

| | | | |
|---|---|---|---|
| 7,426,175 | B2 | 9/2008 | Zhuang et al. |
| 7,548,506 | B2 | 6/2009 | Ma et al. |
| 7,912,012 | B2 | 3/2011 | Ma et al. |
| 7,957,759 | B2 | 6/2011 | Papasakellariou |
| 8,000,228 | B2 | 8/2011 | McCoy |
| 8,018,975 | B2 | 9/2011 | Ma et al. |
| 8,085,814 | B2 | 12/2011 | Ma et al. |
| 8,130,863 | B2 | 3/2012 | Han et al. |
| 8,213,292 | B2 | 7/2012 | Ma et al. |
| 8,441,918 | B2 | 5/2013 | Ma et al. |
| 2001/0017881 | A1 | 8/2001 | Bhatoolaul et al. |
| 2003/0072255 | A1 | 4/2003 | Ma et al. |
| 2004/0042386 | A1 | 3/2004 | Uesugi et al. |
| 2005/0226140 | A1 | 10/2005 | Zhuang et al. |
| 2006/0009227 | A1 | 1/2006 | Cudak et al. |
| 2007/0025236 | A1 | 2/2007 | Ma et al. |
| 2007/0064586 | A1 | 3/2007 | Ma et al. |
| 2007/0064665 | A1 | 3/2007 | Zhang et al. |
| 2007/0066362 | A1 | 3/2007 | Ma et al. |
| 2007/0217530 | A1 | 9/2007 | Hosseinian et al. |
| 2007/0230600 | A1 | 10/2007 | Bertrand et al. |
| 2007/0253465 | A1 | 11/2007 | Muharemovic et al. |
| 2007/0254685 | A1 | 11/2007 | Oketani et al. |
| 2008/0031186 | A1 | 2/2008 | Onggosanusi et al. |
| 2008/0062935 | A1 | 3/2008 | Nakagawa et al. |
| 2009/0060076 | A1 | 3/2009 | Ma et al. |
| 2009/0180443 | A1 | 7/2009 | Kawasaki et al. |
| 2012/0027136 | A1 | 2/2012 | Ma et al. |
| 2012/0113927 | A1 | 5/2012 | Akita et al. |
| 2012/0243626 | A1 | 9/2012 | Ma et al. |
| 2012/0250787 | A1 | 10/2012 | Ma et al. |
| 2013/0188561 | A1 | 7/2013 | Lee et al. |
| 2013/0215997 | A1 | 8/2013 | Lee et al. |
| 2013/0301400 | A1 | 11/2013 | Ma et al. |
| 2014/0036823 | A1 | 2/2014 | Ma et al. |

FOREIGN PATENT DOCUMENTS

| | | |
|---|---|---|
| CN | 1471768 A | 1/2004 |
| CN | 1736052 A | 2/2006 |
| JP | 2003-46481 A | 2/2003 |
| JP | 2003-198504 A | 7/2003 |
| JP | 2007-300316 A | 11/2007 |
| JP | 2008-67328 A | 3/2008 |
| WO | 98/20639 A1 | 5/1998 |
| WO | 2007/126793 A2 | 11/2007 |
| WO | 2007/42492 A2 | 12/2007 |
| WO | 2008/038367 A1 | 4/2008 |
| WO | 2008/143443 A1 | 11/2008 |

OTHER PUBLICATIONS

English Translation of Chinese Search Report dated Jul. 1, 2015, for Corresponding CN Application No. 201210493429X, 2 pages.
English Translation of Chinese Search Report dated Aug. 29, 2014, for corresponding CN Application No. 201210493301.3, 2 pages.
Ericsson, "Comparison of Zadoff-Chu and Zero Correlation Zone Codes for E-UTRA RACH," R1-062275, TSG-RAN WG1 #46, Agenda Item: 8.3.1, Tallinn, Estonia, Aug. 28-Sep. 1, 2006, 7 pages.
Huawei, "Expanded sets of ZCZ-GCL random access preambles," R1-061816, Agenda Item: 4.1, 3GPP TSG RAN LTE Ad Hoc, Cannes, France, Jun. 27-30, 2006, 5 pages.
InterDigital Communications Corporation, "Design Considerations for E-UTRA Uplink Reference Signal and TP," R1-061479, 3GPP TSG RAN WG1 #45, Agenda Item: 11.2.1, Shanghai, China, May 8-12, 2006, 5 pages.
International Search Report, dated Oct. 30, 2007, for International Application No. PCT/JP2007/069051, 3 pages.
Motorola, "EUTRA SC-FDMA Uplink Pilot/Reference Signal Design & TP," R1-060390, 3GPP TSG RAN1#44, Agenda Item: 13.2.2.2., Denver, USA, Feb. 13-17, 2006, pp. 1-6.
Motorola, "Preamble Sequence Design for Non-Synchronized Random Access," R1-062066, Agenda Item: 8.3.1, 3GPP TSG RAN1#46, Tallinn, Estonia, Aug. 28-Sep. 1, 2006, 4 pages.
Panasonic, NTT DoCoMo, "Random access sequence comparison for E-UTRA," R1-062174, Agenda Item: 8.3.1, TSG-RAN WG1 Meeting #46, Tallinn, Estonia, Aug. 28-Sep. 1, 2006, 6 pages.
Panasonic, NTT DoCoMo, "Random access burst design for E-UTRA," R1-062175, Agenda Item: 8.3.1, TSG-RAN WG1 Meeting #46, Tallinn, Estonia, Aug. 28-Sep. 1, 2006, 9 pages.
Samsung, "Synchronized Random Access Design for E-UTRA," R1-062215, Agenda Item: 8.3.1, TSG-RAN WG1 #46, Tallinn, Estonia, Aug. 28-Sep. 1, 2006, 4 pages.

| INDEX | SEQUENCE NUMBER (r) | |
|---|---|---|
| 1 | 1 | N-1 |
| 2 | 2 | N-2 |
| 3 | 3 | N-3 |
| 4 | 4 | N-4 |
| 5 | 5 | N-5 |
| | | |
| | | |
| FLOOR(N/2)-1 | FLOOR(N/2)-1 | FLOOR(N/2)+2 |
| FLOOR(N/2) | FLOOR(N/2) | FLOOR(N/2)+1 |

FIG.6

| q mod N | NUMBER OF INITIAL CYCLIC SHIFTS (m) |
|---|---|
| 0 | N-1 (=-1) |
| 1 | N-3 (=-3) |
| ... | ... |
| FLOOR(N/2)-1 | 2 |
| FLOOR(N/2) | 0 |
| FLOOR(N/2)+1 | N-2 (=-2) |
| ... | ... |
| N-2 | 3 |
| N-1 | 1 |

FIG.15

| INDEX | SEQUENCE NUMBER (r) AND AMOUNT OF INITIAL SHIFT (m) |
|---|---|
| 1 | N-1 (NUMBER OF INITIAL SHIFTS: m) |
| 2 | N-2 (NUMBER OF INITIAL SHIFTS: m) |
| 3 | N-3 (NUMBER OF INITIAL SHIFTS: m) |
| 4 | N-4 (NUMBER OF INITIAL SHIFTS: m) |
| 5 | N-5 (NUMBER OF INITIAL SHIFTS: m) |
| ... | ... |
| FLOOR(N/2)-1 | FLOOR(N/2)+2 (NUMBER OF INITIAL SHIFTS: m) |
| FLOOR(N/2) | FLOOR(N/2)+1 (NUMBER OF INITIAL SHIFTS: m) |

FIG.16

INTEGRATED CIRCUIT FOR CONTROLLING SELECTION OF RANDOM ACCESS PREAMBLE SEQUENCE

BACKGROUND

Technical Field

The present invention relates to a sequence allocation method and a sequence allocating apparatus for allocating a Zadoff-Chu sequence or GCL sequence to a cell.

Description of the Related Art

Mobile communication systems represented by a cellular communication system or wireless radio LAN (i.e., local area network) systems are provided with a random access region in their transmission regions. This random access region is provided in an uplink transmission region when a terminal station (hereinafter, "UE") sends a connection request to a base station (hereinafter, "BS") for the first time, or when a UE makes a new band allocation request in a centralized control system where a BS or the like allocates transmission times and transmission bands to UEs. The base station may be referred to as an "access point" or "Node B."

Furthermore, in a system using TDMA (i.e., time division multiple access) such as the 3GPP RAN LTE, which is currently undergoing standardization, when a connection request is made for the first time (which takes place not only when a UE is powered on but also when uplink transmission timing synchronization is not established such as when handover is in progress, when communication is not carried out for a certain period of time, and when synchronization is lost due to channel conditions, and so on), random access is used for a first process of acquiring uplink transmission timing synchronization, connection request to a BS (i.e., association request) or band allocation request (i.e., resource request).

A random access burst (hereinafter, "RA burst") transmitted in a random access region (hereinafter, "RA slot"), unlike other scheduled channels, results in reception errors and retransmission due to collision between signature sequences (situation in which a plurality of UEs transmit the same signature sequence using the same RA slot) or interference between signature sequences. Collision of RA bursts or the occurrence of reception errors increases processing delays in the acquisition of uplink transmission timing synchronization including RA bursts and processing of association request to the BS. For this reason, a reduction of the collision rate of signature sequences and improvement of detection characteristics of signature sequences are required.

As the method for improving the detection characteristics of signature sequences, generation of a signature sequence from a GCL (i.e., generalized chirp like) sequence having a low auto-correlation characteristic and also a low inter-sequence cross-correlation characteristic or Zadoff-Chu sequence is understudy. A signal sequence, constituting a random access channel and known between transmitter and receiver, is referred to as a "preamble" and a preamble is generally comprised of a signal sequence having better auto-correlation and cross-correlation characteristics. Furthermore, a signature is one preamble pattern, and suppose the signature sequence and preamble pattern are synonymous here.

Non-Patent Documents 1 to 3 use a Zadoff-Chu sequence or GCL sequence, whose sequence length N is a prime number, as an RA burst preamble. Here, adopting a prime number for sequence length N makes it possible to use N-1 sequences with optimal auto-correlation characteristics and cross-correlation characteristics, and optimizes (makes a correlation amplitude value $\sqrt{N}$ constant) cross-correlation characteristics between any two sequences of the available sequences. Therefore, the system can allocate any sequence out of the available Zadoff-Chu sequences to each cell as a preamble.

Non-Patent Document 1: R1-062174, Panasonic, NTT DoCoMo "Random access sequence comparison for E-UTRA"

Non-Patent Document 2: R1-061816, Huawei, "Expanded sets of ZCZ-GCL random access preamble"

Non-Patent Document 3: R1-062066, Motorola, "Preamble Sequence Design for Non-Synchronized Random Access"

BRIEF SUMMARY

Problems to be Solved by the Invention

However, since the Zadoff-Chu sequence or GCL sequence is a complex code sequence where each element making up the sequence is a complex number, a correlation circuit (matched filter) necessary for code detection on the receiving side requires complex multiplication for each element of the sequence, which involves a large amount of calculation and also increases the circuit scale. Furthermore, when the number of different Zadoff-Chu sequences or GCL sequences used in one cell increases, it is necessary to perform correlation calculations corresponding in number to sequences for preamble detection, and this results in the amount of calculation and circuit scale proportional to the number of sequences allocated.

It is an object of the present invention to provide a sequence allocation method and a sequence allocating apparatus that reduces the amount of calculation and circuit scale of the correlation circuit on the receiving side in a system in which a plurality of different Zadoff-Chu sequences or GCL sequences are allocated to one cell.

Means for Solving the Problem

The sequence allocation method of the present invention includes an allocating step of allocating a combination of sequence numbers of Zadoff-Chu sequences or GCL sequences allocated to one cell, having a relationship that the absolute values of the amplitudes of the coefficients of the real part and the imaginary part of each element of the sequence are equal.

The sequence allocating apparatus of the present invention adopts a configuration including a sequence allocating section that allocates combinations of sequence numbers of Zadoff-Chu sequences or generalized chirp like sequences to be allocated to one cell, the combinations of sequence numbers holding a relationship that absolute values of amplitudes of coefficients of real parts and imaginary parts of elements in the sequences are equal and a reporting section that has correspondences between the combinations of sequence numbers and indexes of the combinations, and reports an index corresponding to a combination of sequence numbers allocated.

Advantageous Effect of the Invention

The present invention provides an advantage of reducing the amount of calculation and circuit scale of the correlation circuit on the receiving side in a system in which a plurality of different Zadoff-Chu sequences or GCL sequences are allocated to one cell.

BRIEF DESCRIPTION OF THE SEVERAL VIEWS OF THE DRAWINGS

FIG. 6 shows a correspondence between sequence numbers and indexes;

FIG. 15 shows a correspondence between m and q according to Embodiment 3 of the present invention; and FIG. 16 shows a correspondence between sequence numbers and indexes.

DETAILED DESCRIPTION

Hereinafter, embodiments of the present invention will be explained in detail with reference to the accompanying drawings.

EMBODIMENT 1

First, a Zadoff-Chu sequence will be shown using equations. A Zadoff-Chu sequence having a sequence length N is expressed by equation 1 when N is an even number and expressed by equation 2 when N is an odd number.

[1]
$$c_r(k) = \exp\left\{-j\frac{2\pi r}{N}\left(\frac{k^2}{2} + qk\right)\right\} \quad \text{(Equation 1)}$$

[2]
$$c_r(k) = \exp\left\{-j\frac{2\pi r}{N}\left(\frac{k(k+1)}{2} + qk\right)\right\} \quad \text{(Equation 2)}$$

where k=0, 1, 2, . . . , N-1, "q" is an arbitrary integer and "r" is a sequence number (sequence index). r is coprime to N and is a positive integer smaller than N.

Next, a GCL sequence will be shown using equations. A GCL sequence having a sequence length N is expressed by equation 3 when N is an even number and expressed by equation 4 when N is an odd number.

[3]
$$c_{r,m}(k) = \exp\left\{-j\frac{2\pi r}{N}\left(\frac{k^2}{2} + qk\right)\right\}b_{i(k \bmod m)} \quad \text{(Equation 3)}$$

[4]
$$c_{r,m}(k) = \exp\left\{-j\frac{2\pi r}{N}\left(\frac{k(k+1)}{2} + qk\right)\right\}b_{i(k \bmod m)} \quad \text{(Equation 4)}$$

where k=0, 1, 2, . . . , N-1, "q" is an arbitrary integer, "r" is coprime to N and is a positive integer smaller than N, "$b_i$(k mod m)" is an arbitrary complex number and "i"=0, 1, . . . , m-1. Furthermore, when the cross-correlation between GCL sequences is minimized, an arbitrary complex number of amplitude 1 is used for $b_i$(k mod m).

The GCL sequence is a sequence resulting from multiplying a Zadoff-Chu sequence by $b_i$(k mod m), and since the correlation calculation on the receiving side is similar to that of the Zadoff-Chu sequence, the Zadoff-Chu sequence will be explained as an example below. Furthermore, a case will be explained below where a Zadoff-Chu sequence whose sequence length N is an odd number and a prime number will be used as a preamble sequence of RA burst.

Figure 1:
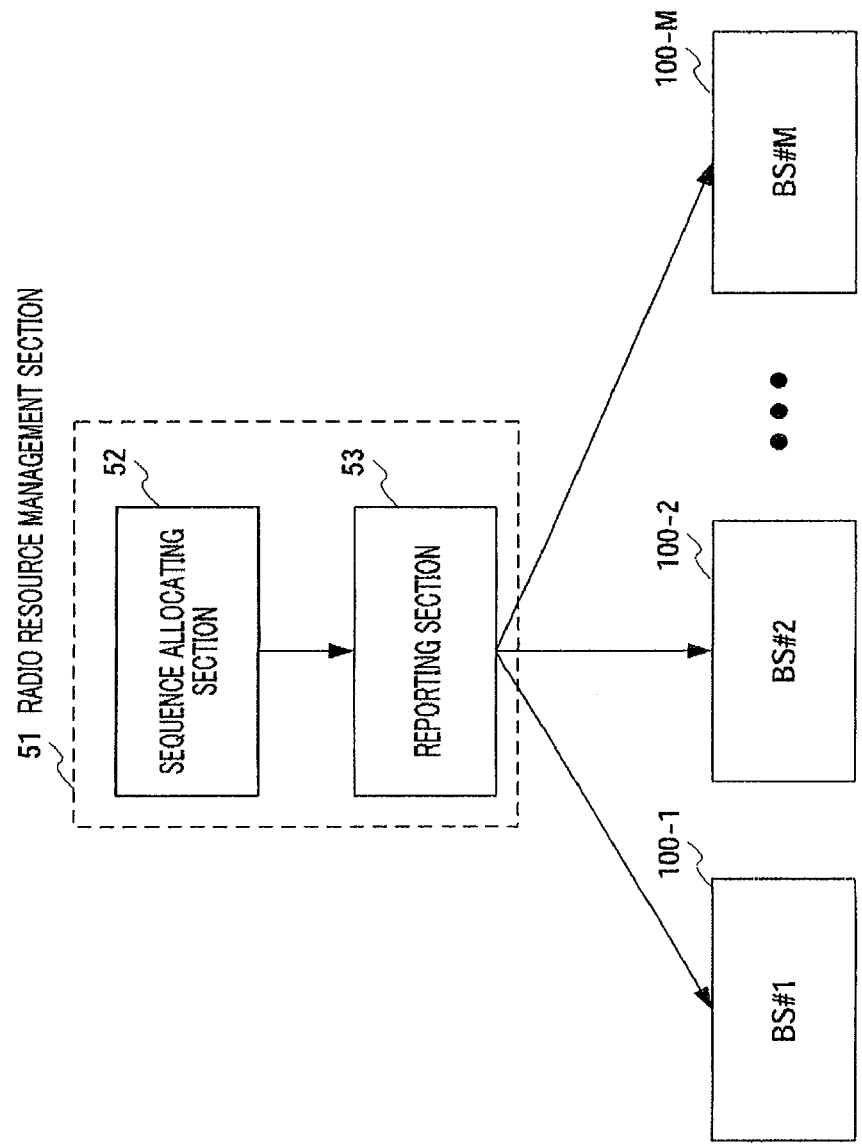
FIG. 1 is a block diagram showing a configuration of a radio communication system according to Embodiment 1 of the present invention.

FIG. 1 is a block diagram showing a configuration of a radio communication system according to Embodiment 1 of the present invention. In this figure, radio resource management section 51 manages radio resources to be allocated to a plurality of BSs (#1 to #M) 100-1 to 100-M and is provided with sequence allocating section 52 and reporting section 53.

Sequence allocating section 52 allocates a sequence number r of a Zadoff-Chu sequence to a cell managed by a BS under the control thereof, and outputs the allocated sequence number r to reporting section 53. Reporting section 53 reports an index indicating the sequence number r outputted from sequence allocating section 52 to BSs 100-1 to 100-M. Details of sequence allocating section 52 and reporting section 53 will be described later.

BSs 100-1 to 100-M broadcast the indexes reported from sequence allocating section 52 to UEs in their own cells, and detect preamble sequences transmitted from the UEs. Since all BSs 100-1 to 100-M have the same function, suppose the BSs will be collectively referred to as BS 100.

Figure 2:
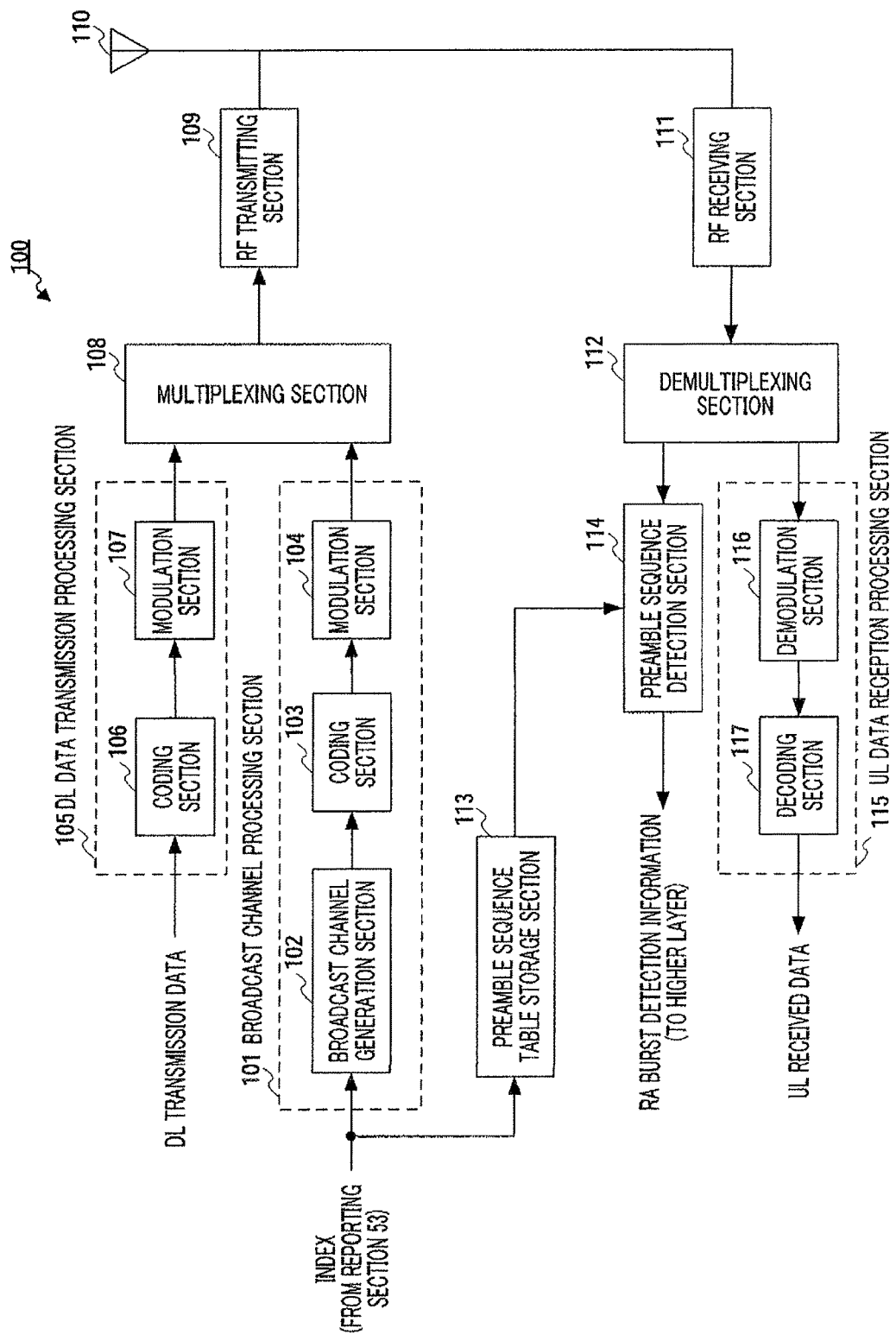
FIG. 2 is a block diagram showing a configuration of the BS shown in FIG. 1.

FIG. 2 a block diagram showing a configuration of BS 100 shown in FIG. 1. In this figure, broadcast channel processing section 101 is provided with broadcast channel generation section 102, coding section 103 and modulation section 104. Broadcast channel generation section 102 generates a broadcast channel, which is a downlink control channel, by including the index reported from reporting section 53 shown in FIG. 1. The broadcast channel generated is outputted to coding section 103.

Coding section 103 encodes the broadcast channel outputted from broadcast channel generation section 102 and modulation section 104 modulates the encoded broadcast channel under a modulation scheme such as BPSK and QPSK. The modulated broadcast channel is outputted to multiplexing section 108.

DL data transmission processing section 105 is provided with coding section 106 and modulation section 107 and performs transmission processing on the DL transmission data. Coding section 106 encodes the DL transmission data and modulation section 107 modulates the encoded DL transmission data under a modulation scheme such as BPSK and QPSK and outputs the modulated DL transmission data to multiplexing section 108.

Multiplexing section 108 performs time multiplexing, frequency multiplexing, space multiplexing or code multiplexing on the broadcast channel outputted from modulation section 104 and DL transmission data outputted from modulation section 107 and outputs the multiplexed signal to RF transmitting section 109.

RF transmitting section 109 applies predetermined radio transmission processing such as D/A conversion, filtering and up-conversion to the multiplexed signal outputted from multiplexing section 108 and transmits the signal subjected to the radio transmission processing from antenna 110.

RF receiving section 111 applies predetermined radio reception processing such as down-conversion and A/D conversion to the signal received via antenna 110 and outputs the signal subjected to the radio reception processing to demultiplexing section 112.

Demultiplexing section 112 separates the signal outputted from RF receiving section 111 into an RA slot and a UL data slot and outputs the separated RA slot to preamble sequence detection section 114 and the UL data slot to demodulation section 116 of UL data reception processing section 115 respectively.

Preamble sequence table storage section 113 stores a preamble sequence table that associates preamble sequences that can be allocated by sequence allocating section 52 shown in FIG. 1, these sequence numbers and indexes indicating these combinations, reads a preamble sequence corresponding to the index reported from reporting section 53 shown in FIG. 1 from the table and outputs the corresponding preamble sequence to preamble sequence detection section 114.

Preamble sequence detection section 114 performs preamble waveform detection processing such as correlation processing on the RA slot outputted from demultiplexing section 112 using a signature stored in preamble sequence table storage section 113 and detects whether or not a preamble sequence has been transmitted from a UE. The detection result (RA burst detection information) is outputted to a higher layer (not shown).

UL data reception processing section 115 is provided with demodulation section 116 and decoding section 117 and performs reception processing on the UL data. Demodulation section 116 corrects distortion of the channel response of the UL data outputted from demultiplexing section 112, makes a signal point decision by a hard decision or soft decision depending on the modulation scheme and decoding section 117 performs error correcting processing about the result of the signal point decision by demodulation section 116 and outputs the UL received data.

Figure 3:
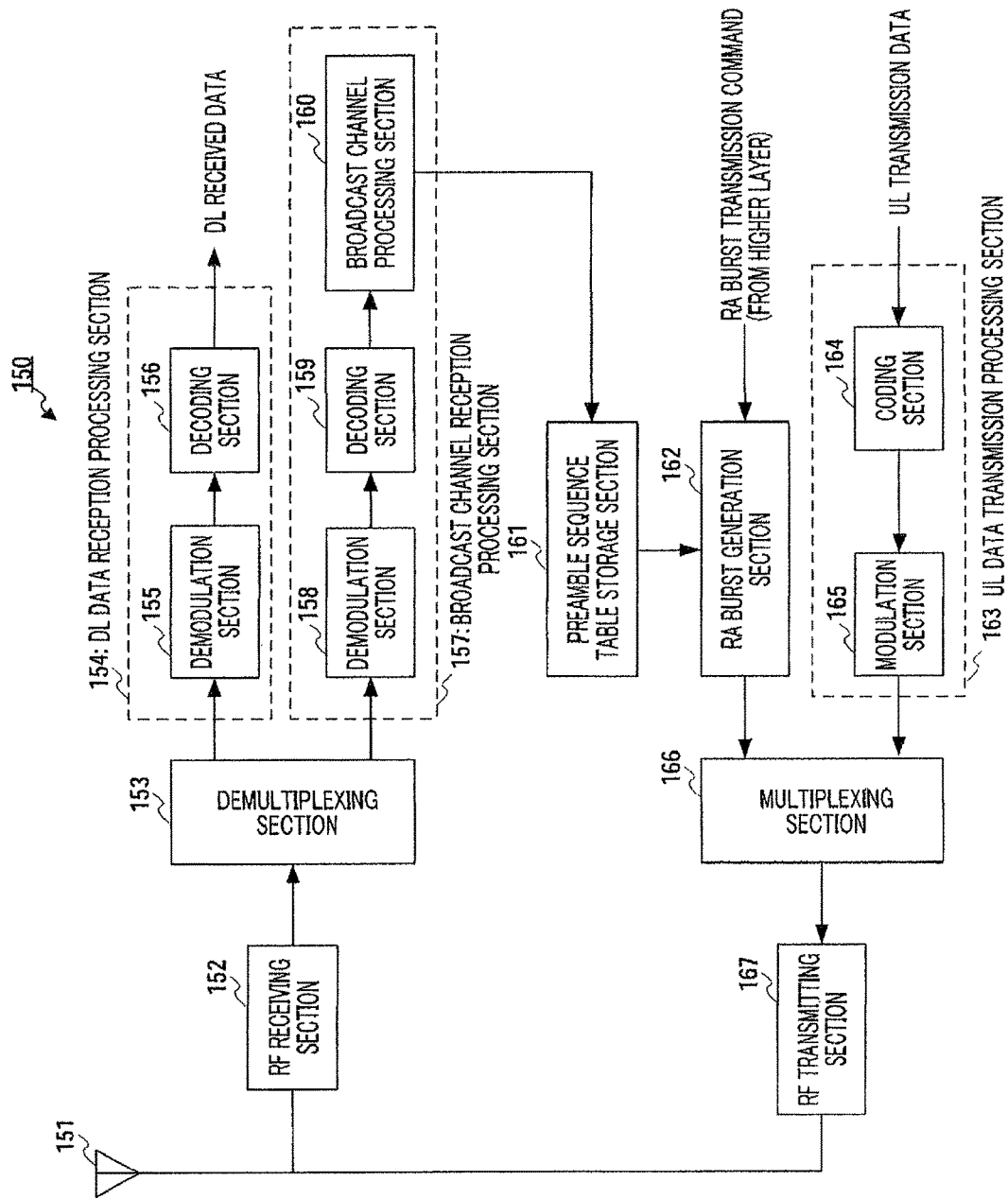
FIG. 3 is a block diagram showing a configuration of a UE according to Embodiment 1 of the present invention.

FIG. 3 is a block diagram showing a configuration of UE 150 according to Embodiment 1 of the present invention. In this figure, RF receiving section 152 receives a signal transmitted from the BS shown in FIG. 1 via antenna 151 and applies predetermined radio reception processing such as down-conversion and A/D conversion to the received signal and outputs the signal subjected to the radio reception processing to demultiplexing section 153.

Demultiplexing section 153 separates the broadcast channel and DL data included in the signal outputted from RF receiving section 152 and outputs the separated DL data to demodulation section 155 of DL data reception processing section 154 and the broadcast channel to demodulation section 158 of broadcast channel reception processing section 157.

DL data reception processing section 154 is provided with demodulation section 155 and decoding section 156, and performs reception processing on the DL data. Demodulation section 155 corrects distortion of the channel response on the DL data outputted from demultiplexing section 153, makes a signal point decision by a hard decision or soft decision depending on the modulation scheme, and decoding section 156 performs error correcting processing on the signal point decision result from demodulation section 155 and outputs the DL received data.

Broadcast channel reception processing section 157 is provided with demodulation section 158, decoding section 159 and broadcast channel processing section 160, and performs reception processing on the broadcast channel. Demodulation section 158 corrects distortion of the channel response of the broadcast channel outputted from demultiplexing section 153, makes a signal point decision by a hard decision or soft decision depending on the modulation scheme, and decoding section 159 performs error correcting processing on the signal point decision result of the broadcast channel by demodulation section 158. The broadcast channel subjected to the error correcting processing is outputted to broadcast channel processing section 160. Broadcast channel processing section 160 outputs the index included in the broadcast channel outputted from decoding section 159 to preamble sequence table storage section 161 and other broadcast channels to a higher layer (not shown).

Preamble sequence storage section 161 stores the preamble sequence table of preamble sequence table storage section 113 of BS 100 shown in FIG. 2. That is, preamble sequence storage section 161 stores a preamble sequence table that associates preamble sequences that can be allocated by sequence allocating section 52 shown in FIG. 1 with these sequence numbers and indexes indicating these combinations. Preamble sequence storage section 161 then outputs a preamble sequence associated with the index outputted from broadcast channel processing section 160 to RA burst generation section 162.

Upon acquiring an RA burst transmission instruction from a higher layer (not shown), RA burst generation section 162 selects one of available preamble sequences from preamble sequence table storage section 161, generates an RA burst including the selected preamble sequence and outputs the generated RA burst to multiplexing section 166.

UL data transmission processing section 163 is provided with coding section 164 and modulation section 165, and performs transmission processing on UL transmission data. Coding section 164 encodes the UL transmission data and modulation section 165 modulates the encoded UL transmission data under a modulation scheme such as BPSK and QPSK and outputs the modulated UL transmission data to multiplexing section 166.

Multiplexing section 166 multiplexes the RA burst outputted from RA burst generating section 162 and the UL transmission data outputted from modulation section 165, and outputs the multiplexed signal to RF transmitting section 167.

RF transmitting section 167 applies predetermined radio transmission processing such as D/A conversion, filtering and up-conversion to the multiplexed signal outputted from multiplexing section 166 and transmits the signal subjected to the radio transmission processing from antenna 151.

Figure 4:
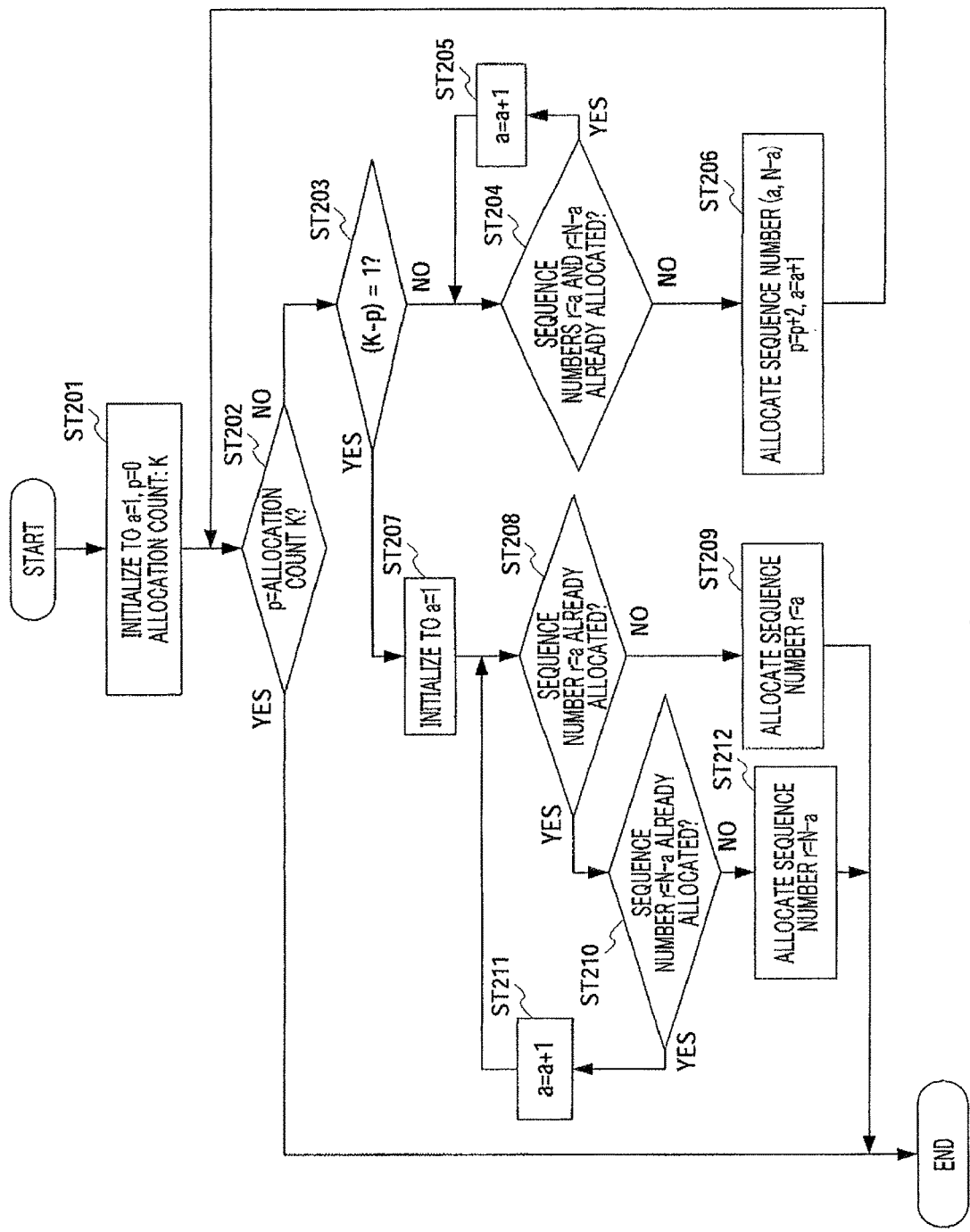
FIG. 4 is a flowchart showing operations of the sequence allocating section shown in FIG. 1.

Next, operations of sequence allocating section 52 shown in FIG. 1 will be explained using FIG. 4. In FIG. 4, in step (hereinafter, abbreviated as "ST") 201, counter a and the current number of sequences allocated p are initialized (a32 1, p=0). Furthermore, suppose the number of sequences allocated to one cell is K.

In ST202, it is decided whether or not the current number of sequences allocated p matches the number of sequences allocated to one cell K. When the numbers match, since the current number of sequences allocated p reaches the number of sequences allocated to one cell K, the sequence allocation processing ends, and when the numbers do not match, sequence allocation still needs to be performed, and therefore the process moves to ST203.

In ST203, it is decided whether or not the value resulting from subtracting the current number of sequences allocated p from the number of sequences allocated to one cell K matches 1. The process moves to ST207 when the value matches 1 or moves to ST204 when the value does not match 1.

In ST204, it is decided whether or not sequence numbers r=a and r=N-a have already been allocated and the process moves to ST205 when at least one of sequence numbers r=a and r=N-a has already been allocated or moves to ST206 when not allocated yet.

In ST205, since it is decided in ST204 that one or both of r=a and r=N-a has/have already been allocated, the counter a is incremented (updated to a=a+1) and the process returns to ST204.

In ST206, sequence numbers r=a and r=N-a decided not to have been allocated to any cell in ST204 are allocated, the current number of sequences allocated p is updated to p=p+2 and the counter a is incremented (updated to a=a+1) and the process returns to ST202.

In ST207, counter a in ST203 is initialized to a=1, and in ST208 it is decided whether or not sequence number r=a has already been allocated. The process moves to ST210 when sequence number r=a has already been allocated or moves to ST209 when not allocated yet.

In ST209, sequence number r=a decided not to have been allocated in ST208 is allocated, and the sequence allocation processing ends.

In ST210, since sequence number r=a has been decided to have been allocated in ST208, it is decided whether or not sequence number r=N-a has already been allocated. The process moves to ST211 when already allocated or moves to ST212 when not allocated yet.

In ST211, since it has been decided in ST210 that sequence number r=N-a has already been allocated, counter a is incremented (updated to a=a+1) and the process returns to ST208.

In ST212, sequence number r=N-a decided not to have been allocated in ST210 is allocated and the sequence allocation processing ends.

Of the sequences that cannot be paired when the number of sequences allocated is an odd number, a procedure for searching sequences to be allocated in ascending order of sequence number is shown in ST208 to ST211, but sequences that have not been allocated yet may also be randomly selected and allocated.

Figure 5A:
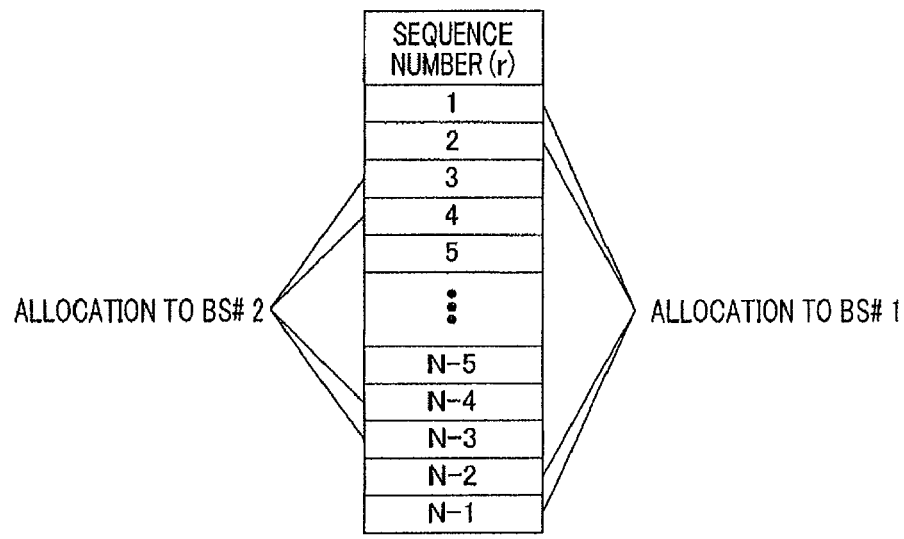
FIGS. 5A and 5B show how a sequence number is allocated to each cell.

Performing such sequence allocation processing allows the sequence allocation as shown in FIG. 5 to be performed. FIG. 5A shows a case where four sequences (even number) are allocated to each cell (here, BS# 1 and BS# 2). That is, sequence numbers r=1, 2, N-1 and N-2 are allocated to BS# 1 and sequence numbers r=3, 4, N-3 and N-4 are allocated to BS# 2. When the number of sequences allocated is two or more, $a_1, a_2, \ldots$ of each pair $(a_1, N-a_1), (a_2, N-a_2) \ldots$ to be allocated may be arbitrarily selected from available sequences.

Figure 5B:
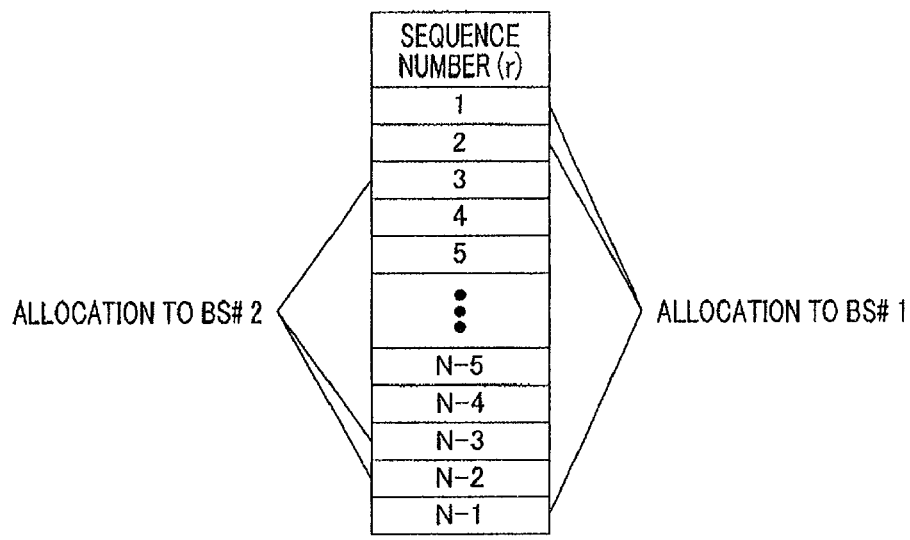

On the other hand, FIG. 5B shows a case where three sequences (odd number) are allocated to each cell. That is, sequence numbers r=1, 2 and N-1 are allocated to BS# 1 and sequence numbers r=3, N-3 and N-2 are allocated to BS# 2. When the number of sequences allocated is an odd number, r=a and r=N-a are allocated in pair, and sequences are selected based on a predetermined selection rule and allocated to sequences that cannot be paired.

Next, the method of reporting indexes by reporting section 53 will be explained. Indexes are determined according to the table shown in FIG. 6 for sequence numbers allocated to each cell by sequence allocating section 52. In FIG. 6, the pair of sequence numbers r=1 and N-1 is associated with index 1 and the pair of sequence numbers r=2 and N-2 is associated with index 2. Pairs of sequence numbers are likewise associated with indexes from index 3 onward. "floor (N/2)" in the figure denotes an integer not greater than N/2.

The indexes determined in this way are broadcast from a BS to UEs through broadcast channels. The UE side is also provided with the same table shown in FIG. 6 and can identify pairs of available sequence numbers using reported indexes.

In this way, by allocating one index to a pair of sequence numbers r=a and r=N-a, it is possible to reduce the number of signaling bits necessary for reporting.

By the way, another reporting method may also be adopted such as assigning indexes to sequence numbers one by one and reporting the indexes.

Furthermore, the number of signaling bits necessary for reporting can further be reduced by increasing a sequence number allocated to one index as 4, 8, . . . .

Figure 7:
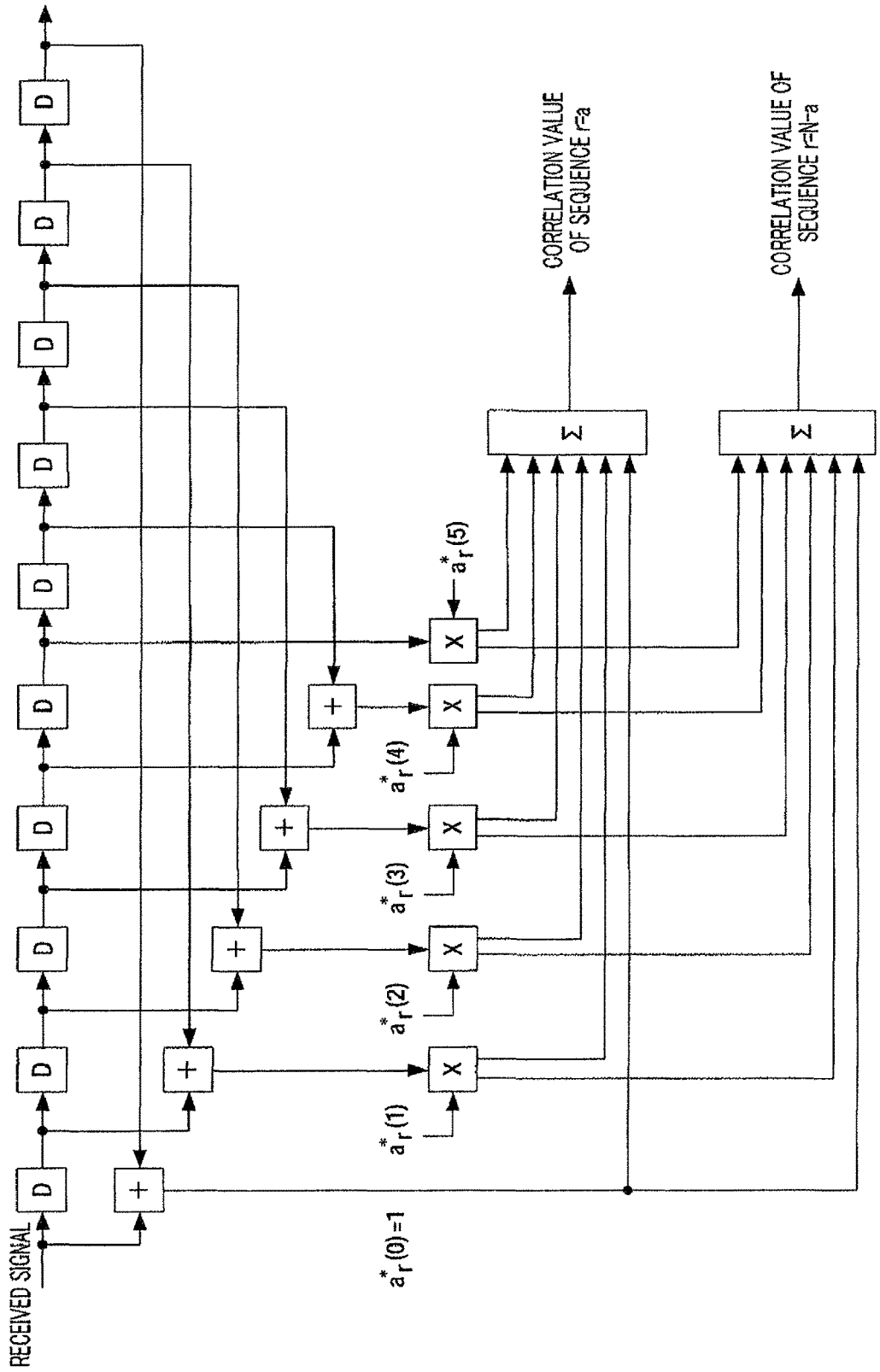
FIG. 7 shows an internal configuration of the preamble sequence detection section shown in FIG. 2.

Next, preamble sequence detection section 114 shown in FIG. 2 will be explained. FIG. 7 shows an internal configuration of preamble sequence detection section 114 shown in FIG. 2. Here, a case where sequence length N=11 will be illustrated.

In FIG. 7, assuming that an input signal from delayer D is $r(k)=a_k+jb_k$ and each coefficient of a Zadoff-Chu sequence with sequence number r=a is $a_{r=a}*(k)=C_k+jd_k$, complex multiplication section x assumes the calculation result with respect to the correlation on the sequence r=a side as $a_k c_k - b_k d_k + j(b_k c_k + a_k d_k)$. On the other hand, each coefficient of a Zadoff-Chu sequence with sequence number r=N-a is $a_{r=N-a}*(k)=(a_{r=a}*(k))*=c_k-jd_k$ and the calculation result with respect to the correlation on the sequence r=N-a side is $a_k c_k + b_k d_k + j(b_k c_k - a_k d_k)$.

Therefore, $a_k c_k$, $b_k d_k$, $b_k c_k$ and $a_k d_k$ of the multiplication operation result carried out to obtain the correlation value on the sequence r=a side can be used to calculate a correlation value on the sequence r=N-a side, and therefore it is possible to reduce the amount of multiplication operation and reduce the circuit scale (number of multipliers).

As is obvious from FIG. 7, since one Zadoff-Chu sequence is in relation of even-symmetric sequence (each element of the sequence is $a_r(k)=a_r(N-1-k)$), the correlator performs multiplication processing by adding up the elements of k and N-1-k before performing multiplication operation, and can thereby further reduce the number of multiplications (number of multipliers) by half.

In this way, when a plurality of different Zadoff-Chu sequences are allocated to one cell, the present embodiment allocates sequences in such combinations that the relationship holds that the elements of the sequences are the complex conjugates of each other, and can thereby reduce the amount of calculation and circuit scale of the correlation circuit on the receiving side without deteriorating detection characteristics of sequences.

A case has been explained in the present embodiment where the sequence length N is a prime number (odd number), but the sequence length N may also be a non-prime number (either an odd number or even number). When the sequence length N is not prime, the sequence number having optimal auto-correlation characteristics that can be used in the entire system, needs to be coprime to the sequence length N.

Figure 8:
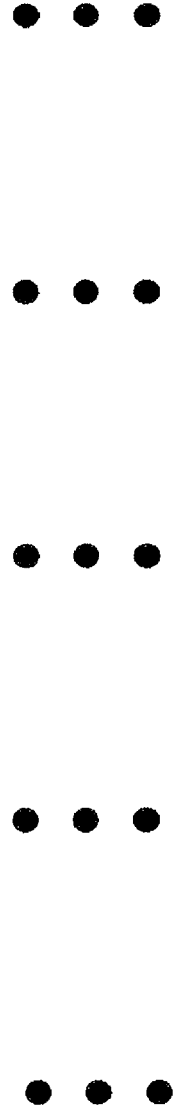
FIG. 8 shows another correspondence between sequence numbers and indexes.

When the sequence length N is an even number, suppose the preamble sequence allocation rule is r=a→r=N-a→r=N/2-a→r=N/2+a (where 1≤a≤N/2-1, furthermore, the allocation order can be arbitrary) and it is thereby possible to carry out correlation calculation of four different sequences with the amount of multiplication operation (number of multipliers) corresponding to one sequence. Since the relationship holds that sequences r=a and r=N-a are complex conjugate to each other, and the relationship holds between r=a and r=N/2-a that the values of the real part and imaginary part are switched and their signs are different, the multiplication operation result can be used as is. Therefore, the amount of multiplication operation and the number of multipliers of one sequence can be reduced to approximately ¼. Furthermore, when the sequence length N is an even number, by allocating one index to a combination of four sequences of r=(a, N-a, N/2-a, N/2+a) as shown in FIG. 8 as a method of reporting sequence allocation, the number of bits required for reporting sequence allocation can be further reduced.

Furthermore, a preamble sequence used in random access has been explained in the present embodiment as an example, but the present invention is not limited to this and is also applicable to a case where a plurality of Zadoff-Chu sequences or GCL sequences are used in one BS as known signals. Such known signals include channel estimation reference signal and pilot signal for downlink synchronization (synchronization channel).

Figure 9:
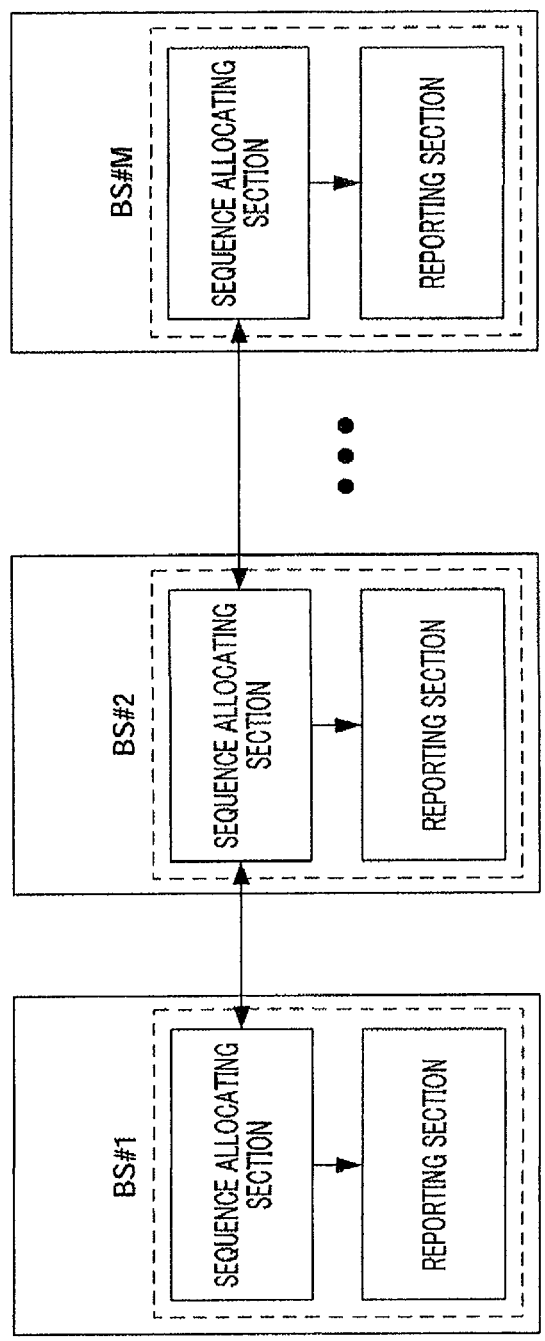
FIG. 9 is a block diagram showing a distributed management type system configuration.

Furthermore, the present embodiment has explained a concentrated management type system configuration in which one sequence allocating section 52 exists for a plurality of BSs as shown in FIG. 1, but the system may also adopt a distributed management type system configuration as shown in FIG. 9 in which each BS is provided with a sequence allocating section and information is exchanged so that mutually different sequence number r of Zadoff-Chu sequences are allocated among a plurality of BSs.

Furthermore, although the present embodiment has described the complex conjugate, the present invention is not limited to this as long as the relationship is maintained that the absolute values of the amplitudes of the coefficients of the real part and the imaginary part are equal.

EMBODIMENT 2

A case has been explained in Embodiment 1 where preamble sequences are generated and detected in the time domain, and a case will be explained in Embodiment 2 of the present invention where preamble sequences are generated and detected in the frequency domain.

The UE configuration according to Embodiment 2 of the present invention is similar to that of Embodiment 1 shown in FIG. 3, and will therefore be explained using FIG. 3.

Figure 10:
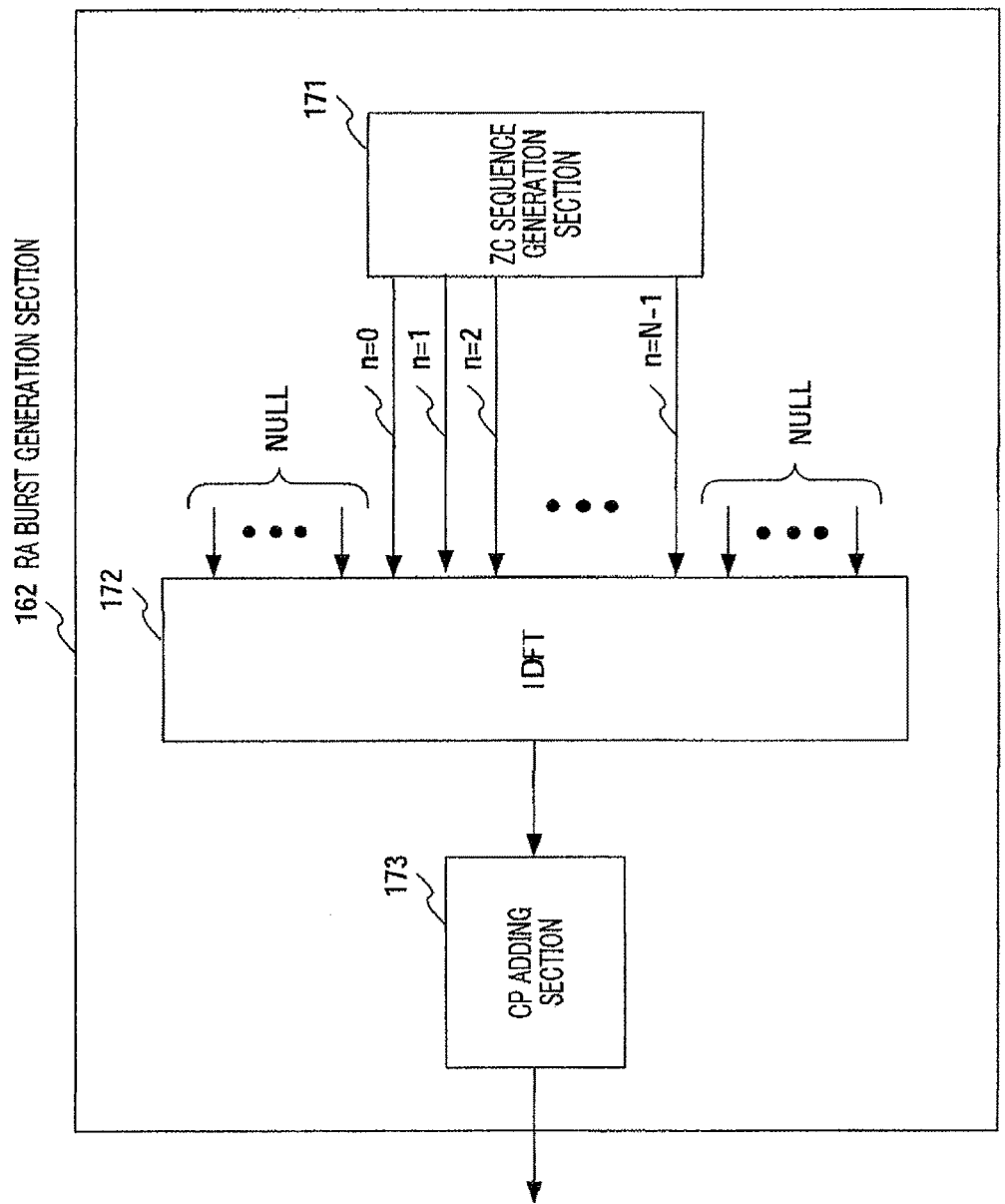
FIG. 10 is a block diagram showing a configuration of an RA burst generation section according to Embodiment 2 of the present invention.

FIG. 10 is a block diagram showing a configuration of RA burst generating section 162 according to Embodiment 2 of the present invention. In this figure, RA burst generating section 162 is provided with ZC sequence generation section 171, IDFT section 172 and CP adding section 173.

ZC sequence generation section 171 generates a Zadoff-Chu sequence in the frequency domain and outputs respective coefficients (symbols) of the Zadoff-Chu sequence generated to predetermined subcarriers of IDFT section 172.

IDFT section 172 applies inverse discrete Fourier transform (IDFT) to an input signal sequence including Zadoff-Chu sequences outputted from ZC sequence generation section 171 to predetermined subcarriers and NULL (value: 0) carried on the remaining subcarriers, and outputs a time domain signal to CP adding section 173.

CP adding section 173 attaches a cyclic prefix (CP) to the time domain signal outputted from IDFT section 172, and outputs the time domain signal to multiplexing section. 166. Here, the "CP" refers to the portion of a sequence duplicating a predetermined length of a signal sequence from the end of the time domain signal outputted from IDFT section 172, added to the head of the time domain signal. By the way, CP adding section 173 may be omitted.

Next, the generation of a Zadoff-Chu sequence in the frequency domain by ZC sequence generation section 171 shown in FIG. 10 and an example of allocation to subcarriers by IDFT section 172 will be explained using FIG. 11.

First, the Zadoff-Chu sequence generated in the frequency domain by ZC sequence generation section 171 will be shown using equations. The Zadoff-Chu sequence having a sequence length N is expressed by equation 5 when N is an even number and expressed by equation 6 when N is an odd number.

Here, although the equations are the same as those of the Zadoff-Chu sequence in Embodiment 1, since the Zadoff-Chu sequence will be defined in the frequency domain, the equations will be redefined using different symbols to make a distinction from the definition in the time domain of Embodiment 1.

[5]
$$c_u(n) = \exp\left\{-j\frac{2\pi u}{N}\left(\frac{n^2}{2} + qn\right)\right\} \quad \text{(Equation 5)}$$

[6]
$$c_u(n) = \exp\left\{-j\frac{2\pi u}{N}\left(\frac{n(n+1)}{2} + qn\right)\right\} \quad \text{(Equation 6)}$$

where n=0, 1, 2, . . . , N-1, "q" is an arbitrary integer, "u" is a sequence number (sequence index), and N is coprime to N and an integer smaller than N. The Zadoff-Chu sequence generated in the frequency domain expressed by equation 5 and equation 6 can be transformed into a Zadoff-Chu sequence generated in the time domain by applying Fourier transform. That is, a Zadoff-Chu sequence generated in the frequency domain becomes a Zadoff-Chu sequence in the time domain, too.

Figure 11:
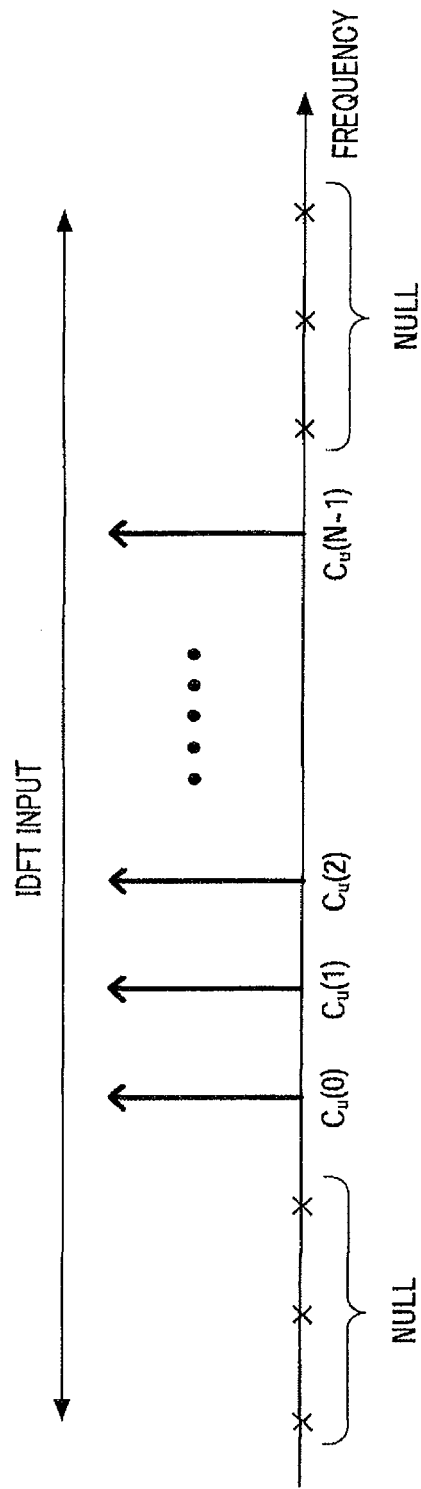
FIG. 11 illustrates an example of generation of a ZC sequence in a frequency domain by the ZC sequence generation section shown in FIG. 10 and allocation to subcarriers by the IDFT section.

As shown in FIG. 11, respective coefficients $C_u(n)$ of the Zadoff-Chu sequence generated based on equation 5 or equation 6 in ZC sequence generation section 171 are arranged on subcarriers of IFFT section 172 in order of $C_u(0)$, $C_u(1)$, $C_u(2)$, ..., $C_u(N-1)$. NULLs (no input signal or value 0) are normally set on the remaining subcarriers of IFFT section 172.

Operations of sequence allocating section 52 of the present embodiment (see FIG. 1) are the same as those of Embodiment 1 in FIG. 4 except that the symbol indicating a sequence number is changed from r to u. Furthermore, the method of reporting indexes of reporting section 53 is also the same as that of Embodiment 1, and when an even number of sequences are always allocated to one cell, it is possible to reduce the required number of bits when sequence allocation is reported by giving one index to a pair of sequences u=a and u=N-a.

It is also possible to further reduce the required number of bits when sequence allocation is reported by setting 4, 8, ... as pairs of sequence numbers allocated to one index.

Since the configuration of a BS according to Embodiment 2 of the present invention is similar to the configuration of Embodiment 1 shown in FIG. 2, FIG. 2 will be used for explanations thereof.

Figure 12:
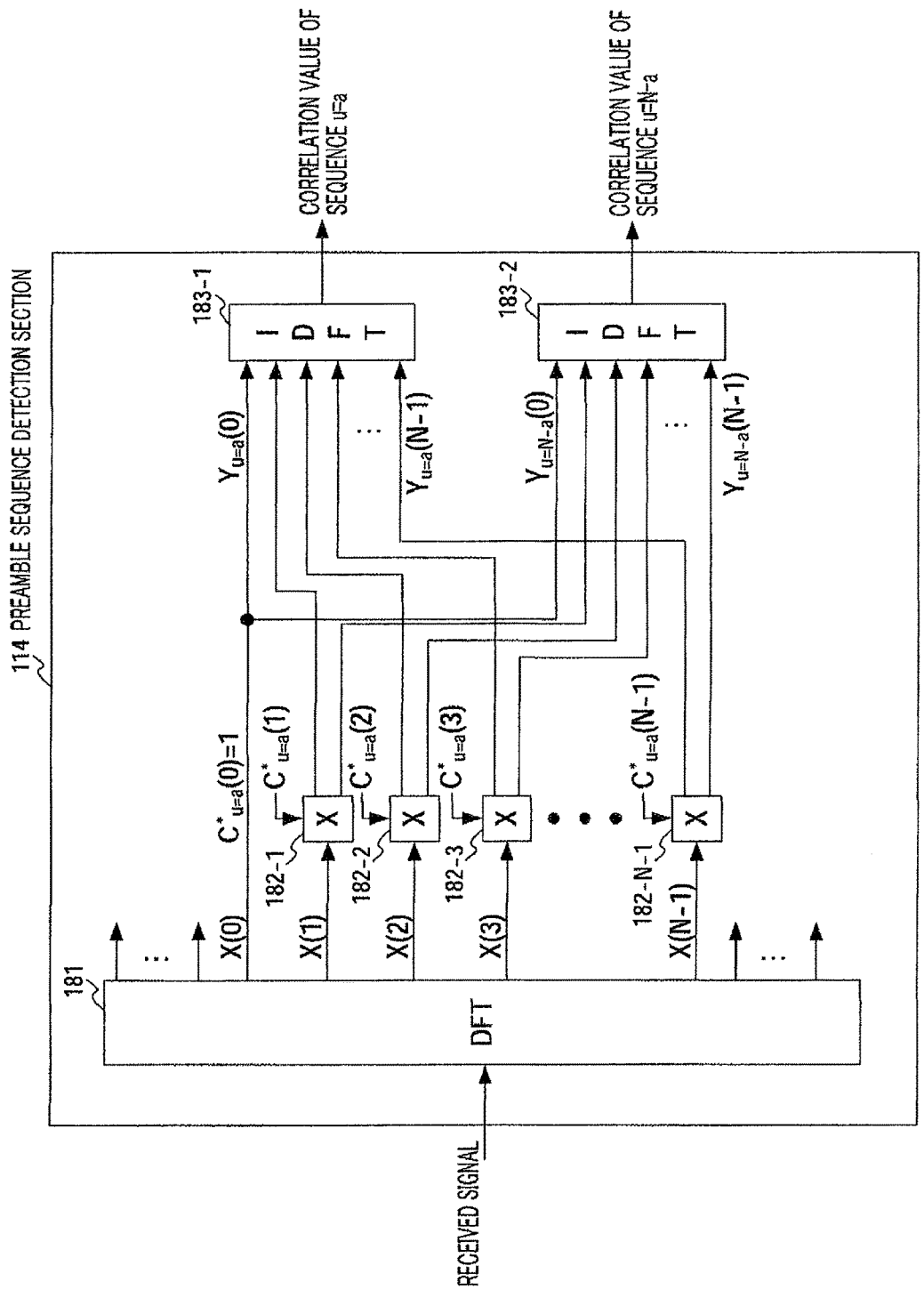
FIG. 12 is a block diagram showing an internal configuration of the preamble sequence detection section according to Embodiment 2 of the present invention.

FIG. 12 is a block diagram showing an internal configuration of preamble sequence detection section 114 according to Embodiment 2 of the present invention. In this figure, preamble sequence detection section 114 is provided with DFT section 181, complex multiplication sections 182-1 to 182-N-1, and IDFT sections 183-1 and 183-2. Here, a case where sequence length N=11 will be illustrated as an example.

DFT section 181 applies discrete Fourier transform (DFT) to a received signal outputted from demultiplexing section 112 and outputs a frequency domain signal to complex multiplication sections 182-1 to 182-N-1 and IDFT sections 183-1 and 183-2.

By the way, the DFT processing and IDFT processing maybe replaced by FFT (fast Fourier transform) processing and IFFT (inverse fast Fourier transform) processing respectively.

Here, assuming that the frequency domain signal outputted from DFT section 181 is $X(n)=\text{Re}\{X(n)\}+j\text{Im}\{X(n)\}$, if each coefficient of the Zadoff-Chu sequence with sequence number u=a is $Cu_{u=a}^*(n)=\text{Re}\{C_{u=a}^*(n)\}+j\text{Im}\{C_{u=a}^*(n)\}$, the calculation result $Y_{u=a}(n)$ with respect to the correlation on the sequence u=a side of complex multiplication sections 182-1 to 182-N-1 is as shown in following equation 7.

[7]

$$Y_{u=a}(n) = \text{Re}\{X(n)\}\text{Re}\{C_{u=a}^*(n)\} - \text{Im}\{X(n)\}\text{Im}\{C_{u=a}^*(n)\} + \quad \text{(Equation 7)}$$
$$j(\text{Im}\{X(n)\}\text{Re}\{C_{u=a}^*(n)\} + \text{Re}\{X(n)\}\text{Im}\{C_{u=a}^*(n)\})$$

On the other hand, each coefficient of the Zadoff-Chu sequence with sequence number u=N-a is $C_{u=N-a}^*(n)=(C_{u=a}^*(n))^*=\text{Re}\{C_{u=a}^*(n)\}-j\text{Im}\{C_{u=a}^*(n)\}$ and the calculation result $Y_{u=N-a}(n)$ with respect to the correlation on the sequence u=N-a side is as shown in following equation 8.

[8]

$$Y_{u=N-a}(n) = \text{Re}\{X(n)\}\text{Re}\{C_{u=a}^*(n)\} + \text{Im}\{X(n)\}\text{Im}\{C_{u=a}^*(n)\} + \quad \text{(Equation 8)}$$
$$j(\text{Im}\{X(n)\}\text{Re}\{C_{u=a}^*(n)\} - \text{Re}\{X(n)\}\text{Im}\{C_{u=a}^*(n)\})$$

Figure 13:
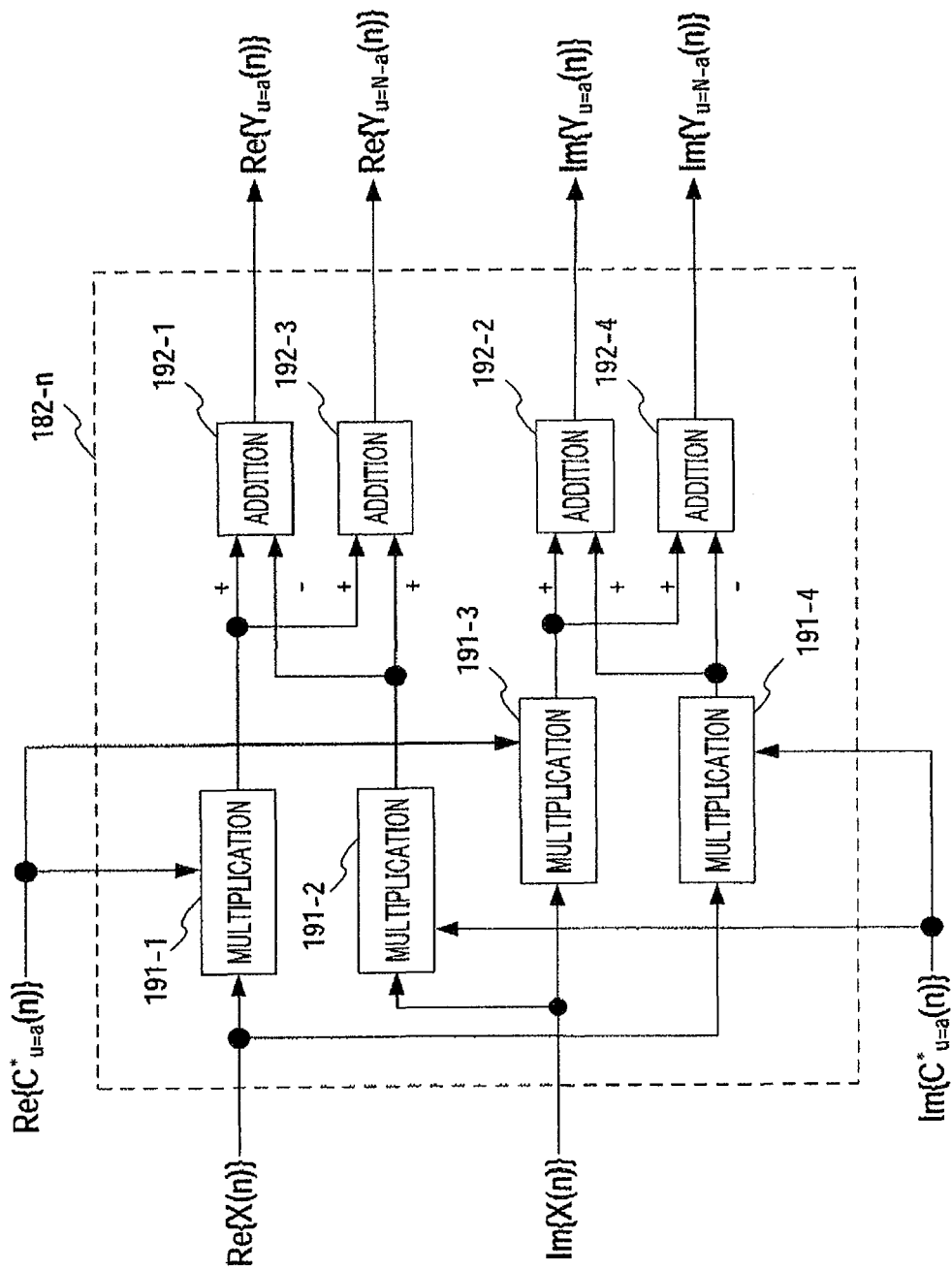
FIG. 13 is a block diagram showing an internal configuration of the complex multiplication section shown in FIG. 12.

FIG. 13 is a block diagram showing an internal configuration of complex multiplication section 182-n (1≤n≤N-1) shown in FIG. 12. In this figure, multiplication section 191-1 multiplies $\text{Re}\{X(n)\}$ by $\text{Re}\{C_{u=a}^*(n)\}$ and outputs the multiplication result to addition sections 192-1 and 192-3.

Multiplication section 191-2 multiplies $\text{Im}\{X(n)\}$ by $\text{Im}\{C_{u=a}^*(n)\}$ and outputs the multiplication result to addition sections 192-1 and 192-3.

Furthermore, multiplication section 191-3 multiplies $\text{Im}\{X(n)\}$ by $\text{Re}\{C_{u=a}^*(n)\}$ and outputs the multiplication result to addition sections 192-2 and 192-4.

Furthermore, multiplication section 191-4 multiplies $\text{Re}(X(n))$ by $\text{Im}\{C_{u=a}^*(n)\}$ and outputs the multiplication result to addition sections 192-2 and 192-4.

Addition section 192-1 adds up the multiplication results outputted from multiplication sections 191-1 and 191-2 and outputs the addition result $\text{Re}\{Y_{u=a}(n)\}$. On the other hand, addition section 192-3 adds up the multiplication results outputted from multiplication sections 191-1 and 192-2 and outputs the addition result $\text{Re}\{Y_{u=N-a}(n)\}$.

Furthermore, addition section 192-2 adds up the multiplication results outputted from multiplication sections 191-3 and 191-4 and outputs the addition result $\text{Im}\{Y_{u=N-a}(n)\}$. Furthermore, addition section 192-4 adds up the multiplication results outputted from multiplication sections 191-3 and 192-4 and outputs the addition result $\text{Im}\{Y_{u=N-a}(n)\}$.

The internal configuration of complex multiplication section 182-n shown in FIG. 13 is the same as the configuration of the complex multiplication section of Embodiment 1 shown in FIG. 7.

Therefore, the results of multiplication operations carried out to obtain the correlation value on the sequence r=a side, $\text{Re}\{X(n)\}\cdot\text{Re}\{C_{u=a}^*(n)\}$, $\text{Im}\{X(n)\}\cdot\text{Im}\{C_{u=a}^*(n)\}$, $\text{Im}\{X(n)\}\cdot\text{Re}\{C_{u=a}^*(n)\}$ and $\text{Re}\{X(n)\}\cdot\text{Im}\{C_{u=a}^*(n)\}$ can be used to calculate a correlation value on the sequence r=N-a side, and it is thereby possible to reduce the amount of multiplication operation and reduce the circuit scale (the number of multipliers).

When N is an odd number and q=0, since one Zadoff-Chu sequence is in relation of even-symmetric sequence (each element of the sequence is $C_u(n)=C_u(N-1-k)$), the correlator performs addition processing on elements of k and N-1-k before multiplication operation and it is thereby possible to further reduce the number of multiplications (the number of multipliers) by half.

In this way, when allocating a plurality of different Zadoff-Chu sequences to one cell, Embodiment 2 combines and allocates sequence numbers having a relationship that absolute values of the amplitude of coefficients of the real part and the imaginary part of the sequence whose each element is $C_u(n)$ are equal (or complex conjugate to each other), and can thereby reduce the amount of calculation and circuit scale of the correlation circuit in the frequency domain on the receiving side without deteriorating the detection characteristics of the sequence.

A case has been explained in the present embodiment where the sequence length N is a prime number (odd number), but the sequence length N may also be a non-prime number (either an odd number or even number). However, when the sequence length N is an even number, suppose the preamble sequence allocation rule is u=a→u=N-a→u=N/2-a→u=N/2+a (where, 1≤a≤N/2-1, furthermore, the allocation order can be arbitrary) and it is thereby possible to carry out correlation calculation of four different sequences with an amount of multiplication operation (the number of multipliers) for one sequence. Therefore, the amount of multiplication operation and the number of multipliers of one sequence can be reduced to approximately ¼. Furthermore, when the sequence length N is an even number, it is possible to further reduce the number of bits required to report sequence allocation by allocating one index to four combinations of sequences of u=(a, N-a, N/2-a, N/2+a) as the method of reporting sequence allocation as in the case of FIG. 8.

EMBODIMENT 3

A case will be explained in Embodiment 3 of the present invention where preamble sequences are generated in the time domain and the preamble sequences are detected in the frequency domain.

Since the configuration of a UE according to Embodiment 3 of the present invention is similar to the configuration of Embodiment 1 shown in FIG. 3, FIG. 3 will be used for explanations thereof.

Figure 14:
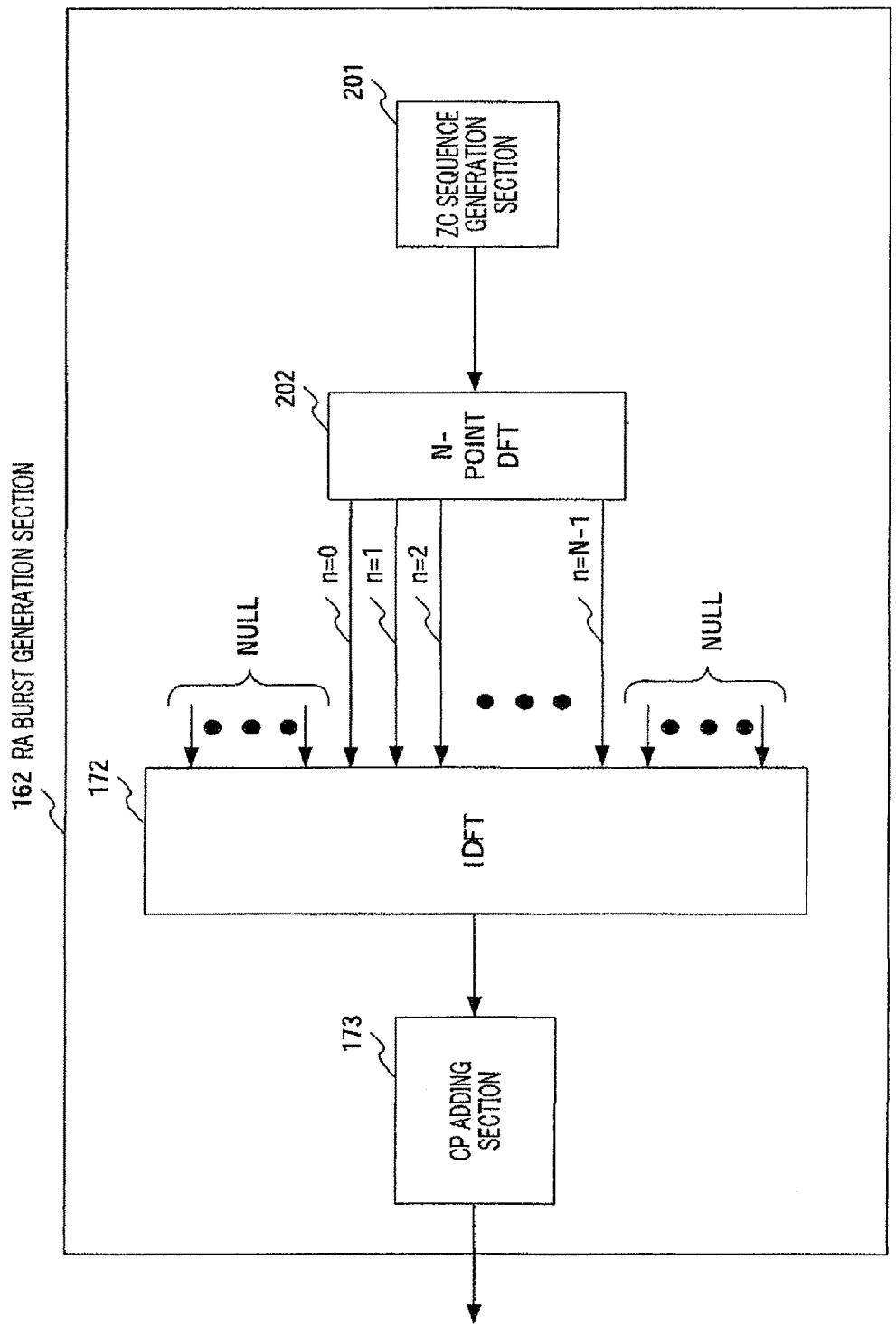
FIG. 14 is a block diagram showing a configuration of an RA burst generation section according to Embodiment 3 of the present invention.

FIG. 14 is a block diagram showing a configuration of RA burst generating section 162 according to Embodiment 3 of the present invention. FIG. 14 is different from FIG. 10 in that N-point DFT section 202 is added and ZC sequence generation section 171 is changed to ZC sequence generation section 201.

ZC sequence generation section 201 generates a Zadoff-Chu sequence in the time domain and outputs each coefficient (symbol) of the generated Zadoff-Chu sequence to N-point DFT section 202.

N-point DFT section 202 has the same number of points as the sequence length N of the Zadoff-Chu sequence, transforms Zadoff-Chu sequences at N points outputted from ZC sequence generation section 201 to frequency components and outputs the frequency components to predetermined subcarriers of IDFT section 172.

By the way, FIG. 14 shows a configuration example of DFT-S-OFDM (discrete Fourier transform-spread-orthogonal frequency division multiplexing) and the time domain signal of the Zadoff-Chu sequence to be outputted from ZC sequence generation section 201 to CP adding section 173 may be directly generated without using N-point DFT section 202 and IDFT section 172.

Operation of sequence allocating section 52 (see FIG. 1) according to the present embodiment are the same as those in Embodiment 1 in sequence numbers r=a and r=N-a allocated in pairs, and different in the equation of the Zadoff-Chu sequence generated in ZC sequence generation section 201.

To be more specific, the Zadoff-Chu sequence generated in the time domain by ZC sequence generation section 201 is allocated so that "the sequence of r=a and the sequence resulting from cyclically shifting r=N-a by m" or "the sequence resulting from cyclically shifting r=a by m and the sequence of r=N-a" are paired.

Here, m varies depending on the value of q in equations 1 to 4. FIG. 15 shows a relationship between m and q when the sequence length N is an odd number. For example, m=N-1(=-1) when q=0 and m=N-3(=-3) when q=1.

When the sequence length N is prime and q=0, the Zadoff-Chu sequence generated in the time domain by ZC sequence generation section 201 is defined by following equation 9 from equation 2 when the sequence of r=a is paired with the sequence resulting from cyclically shifting r=N-a by m.

[9]
$$c_{r=a}(k) = \exp\left\{-j\frac{2\pi r}{N}\left(\frac{k(k+1)}{2}\right)\right\} \quad \text{(Equation 9)}$$
$$c_{r=N-a}(k) = \exp\left\{-j\frac{2\pi r}{N}\left(\frac{(k+m)\bmod N \cdot (k+1+m)\bmod N}{2}\right)\right\}$$

Here, since modN is omissible, equation 9 can be expressed by following equation 10.

[10]
$$c_{r=a}(k) = \exp\left\{-j\frac{2\pi r}{N}\left(\frac{k(k+1)}{2}\right)\right\} \quad \text{(Equation 10)}$$
$$c_{r=N-a}(k) = \exp\left\{-j\frac{2\pi r}{N}\left(\frac{(k+m)(k+1+m)}{2}\right)\right\}$$

Likewise, the case where the sequence resulting from cyclically shifting r=a by m is paired with the sequence of r=N-a can be expressed by following equation 11.

[11]
$$c_{r=a}(k) = \exp\left\{-j\frac{2\pi r}{N}\left(\frac{(k+m)(k+1+m)}{2}\right)\right\} \quad \text{(Equation 11)}$$
$$c_{r=N-a}(k) = \exp\left\{-j\frac{2\pi r}{N}\left(\frac{k(k+1)}{2}\right)\right\}$$

where, k=0, 1, 2, . . . , N-1 and "r" is a sequence number (sequence index). Furthermore, r is coprime to N and is an integer smaller than N.

Next, the index reporting method of reporting section 53 according to Embodiment 3 of the present invention will be explained. Indexes are determined for the sequence numbers allocated to each cell by sequence allocating section 52 according to a table as shown in FIG. 16. In FIG. 16, sequence number r=1, N-1 and the amount of initial shift m are associated with index 1 and sequence number r=2, N-2 and the amount of initial shift m are associated with index 2. Similar associations are also made with indexes from index 3 onward. In the figure, "floor (N/2)" denotes an integer not greater than N/2.

The indexes determined in this way are broadcast to UEs from the BS through broadcast channels. The UE side may also be provided with the same table as shown in FIG. 16 and identifies the pair of available sequence numbers using reported indexes.

in this way, when allocating a plurality of different Zadoff-Chu sequences to one cell, Embodiment 3 allocates sequence numbers in such combinations that the relationship holds that the absolute values of the amplitudes of the coefficients of the real part and the imaginary part of the Zadoff-Chu sequence which is defined in the time domain and in which each element is $C_r(k)$, are equal or complex conjugate to each other, and further gives a predetermined amount of initial cyclic shift of one or both of sequences allocated in pair, and can thereby reduce the amount of calculation and circuit scale of the correlation circuit in the frequency domain on the receiving side without deteriorating the detection characteristics of the sequence.

A case has been explained as an example with the present embodiment where the Zadoff-Chu sequence is defined in the time domain and preamble detection is performed in the frequency domain (correlation calculation in the frequency domain), but in the case where the Zadoff-Chu sequence is defined in the frequency domain and preamble detection is performed in the time domain (correlation calculation in the time domain) as in the case of Embodiment 3, it is also possible to maintain the relationship that the absolute values of the amplitudes of the coefficients of the real part and the imaginary part are equal with respect to the coefficients of two Zadoff-Chu sequences in the time domain by allocating the Zadoff-Chu sequences so that "the sequence of u=a and the sequence resulting from cyclically shifting u=N−a by +a" or "the sequence resulting from cyclically shifting u=a by −a and the sequence of u=N−a" are paired. This can reduce the amount of calculation and circuit scale of the correlation circuit in the time domain on the receiving side.

Furthermore, a case has been explained in the above-described embodiments where Zadoff-Chu sequences are used, but the present invention is not limited to this and GCL sequences may also be used.

Configurations have been explained with the above-described embodiments where sequence allocating section 52 and reporting section 53 are included in radio resource management section 51 or BS as an example, but the present invention is not limited to this, and the present invention is also applicable to any other apparatuses such as a relay station and UE that include sequence allocating section 52 and reporting section 53 and can report indexes indicating a sequence number r.

Furthermore, the above-described embodiments have been explained using a base station (BS) and a terminal station (UE) as an example, and the base station may also be referred to as an access point (AP), relay station, relay terminal, Node B, eNode B or the like. Furthermore, the terminal station may also be referred to as a mobile station (MS), station, UE (user equipment), terminal end (TE), relay station, relay terminal or the like.

A case has been explained in the above-described embodiments where the present invention is configured by hardware as an example, but the present invention can also be implemented by software.

Furthermore, each functional block used for the explanations of the above-described embodiments is typically implemented as an LSI which is an integrated circuit. These may be integrated into a single chip individually or may be integrated into a single chip so as to include some or all functional blocks. Here, the term LSI is used, but the term may also be "IC," "system LSI," "super LSI" or "ultra LSI" depending on the difference in the degree of integration.

Furthermore, the technique of implementing an integrated circuit is not limited to an LSI but can also be implemented with a dedicated circuit or a general-purpose processor. It is also possible to use an FPGA (Field Programmable Gate Array) which can be programmed or a reconfigurable processor whose connections or settings of circuit cells inside the LSI are reconfigurable after LSI manufacturing.

Moreover, if a technology of realizing an integrated circuit which is substitutable for an LSI appears with the progress in semiconductor technologies and other derived technologies, it is of course possible to integrate functional blocks using the technology. The application of biotechnology or the like can be considered as a possibility.

The disclosures of Japanese Patent Application No. 2006-269327, filed on Sep. 29, 2006 and Japanese Patent Application No. 2006-352897, filed on Dec. 27, 2006, including the specification, drawings and abstract, is incorporated herein by reference in its entirety.

INDUSTRIAL APPLICABILITY

The sequence allocation method and sequence allocating apparatus according to the present invention can reduce the amount of calculation and circuit scale of a correlation circuit on the receiving side in a system in which a plurality of different Zadoff-Chu sequences or GCL sequences are allocated to one cell, and are applicable to, for example, a mobile communication, system.

The invention claimed is:

1. A communication apparatus comprising:
a transmitter, which, in operation, transmits, to a terminal, an index that is associated with a sequence number a and a sequence number N-a, wherein a is an integer, and N is a sequence length; and
a receiver, which, in operation, receives, from the terminal, a random access preamble generated from a sequence with the sequence number a or a sequence with the sequence number N-a based on the index.

2. The communication apparatus according to claim 1, wherein the terminal selects one of the sequence number a and the sequence number N-a to generate the random access preamble.

3. The communication apparatus according to claim 1, wherein the transmitter, in operation, broadcasts the index.

4. The communication apparatus according to claim 1, wherein the sequence $c_r(k)$ is defined by $$c_r(k) = \exp\left\{-j\frac{2\pi r}{N}\left(\frac{k(k+1)}{2} + qk\right)\right\}$$

where q is an integer, r is a sequence number, and k is 0 to N-1.

5. The communication apparatus according to claim 1, wherein the sequence with the sequence number a and the sequence with the sequence number N-a are conjugate to each other.

6. A communication method comprising:
transmitting, to a terminal, an index that is associated with a sequence number a and a sequence number N-a, wherein a is an integer, and N is a sequence length; and
receiving, from the terminal, a random access preamble generated from a sequence with the sequence number a or a sequence with the sequence number N-a based on the index.

7. The communication method according to claim 6, wherein terminal selects one of the sequence number a and the sequence number N-a to generate the random access preamble.

8. The communication method according to claim 6, wherein the transmitting includes broadcasting the index.

9. The communication method according to claim 6, wherein the sequence $c_r(k)$ is defined by $$c_r(k) = \exp\left\{-j\frac{2\pi r}{N}\left(\frac{k(k+1)}{2} + qk\right)\right\}$$

where q is an integer, r is a sequence number, and k is 0 to N-1.

10. The communication method according to claim 6, wherein the sequence with the sequence number a and the sequence with the sequence number N-a are conjugate to each other.

* * * * *